Feb. 16, 1937. R. J. LEPPER 2,070,665
COMBINED HOSE AND SPRINKLER
Filed July 27, 1936
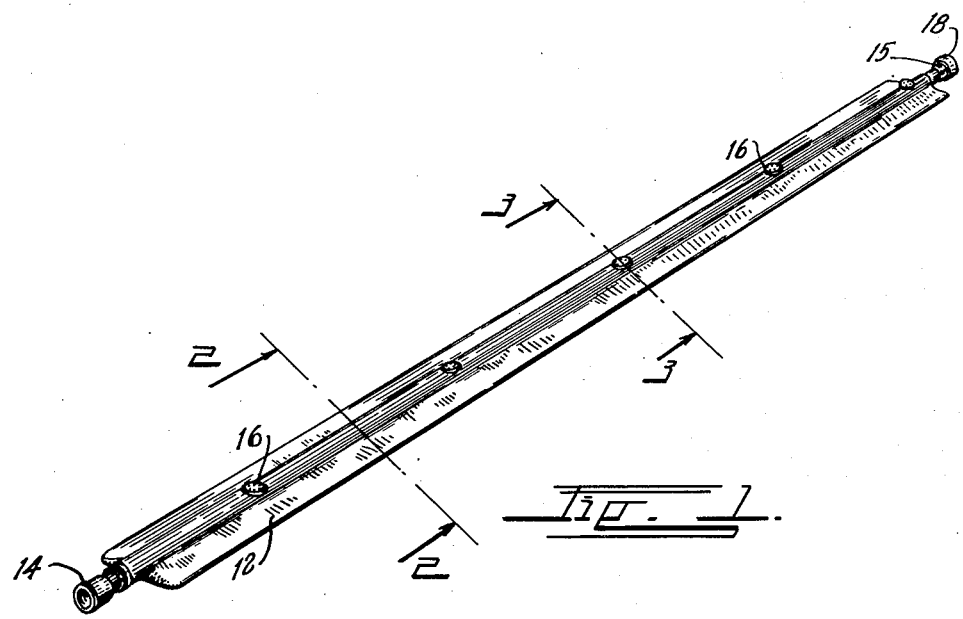
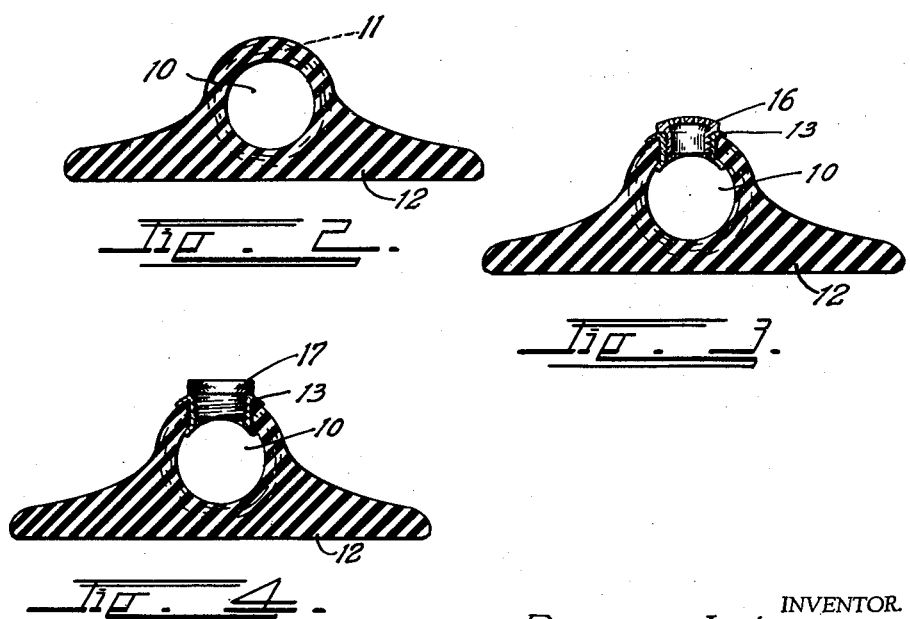
INVENTOR.
ROBERT J. LEPPER.
BY
ATTORNEY.

Patented Feb. 16, 1937

2,070,665

UNITED STATES PATENT OFFICE 2,070,665

COMBINED HOSE AND SPRINKLER

Robert J. Lepper, Denver, Colo.

Application July 27, 1936, Serial No. 92,796

3 Claims. (Cl. 299—106)

It is often difficult to efficiently set hose sprinklers along a long narrow stretch of lawn. This invention relates to a sprinkling device which in reality is a part of the hose so that it can be set along a long narrow section of lawn. The principal object of the invention is to provide a flexible hose section with spaced-apart sprinkling heads and to so construct the hose section that it will always maintain the sprinkler heads in their proper vertical position.

Another object of the invention is to form the section so that the supporting base and the sprinklers will be an integral part of the hose itself so that it may be furnished and used as a complete unit and rolled and stored with the hose, and so that it may be flexed to cover an area of any desired shape.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:—

Fig. 1 is a perspective view illustrating a section of the complete sprinkling hose.

Fig. 2 is a cross section therethrough, taken on the line 2—2, Fig. 1.

Figs. 3 and 4 are similar cross sections taken on the line 3—3, Fig. 1.

The invention comprises a relatively long flexible rubber section of hose preferably furnished in ten foot lengths. The section consists of a tubular portion 10 preferably surrounded by suitable reinforcing fabric 11. The tubular portion 10 is preferably molded as an integral part of a flexible, flat bottomed base portion 12.

The base portion 12 projects on both sides of the tubular portion 10, to form a relatively wide flat supporting base for the tubular portion.

In manufacturing the device, the tubular section 10 is preformed of raw rubber with the fabric 11 imbedded therein. It is then placed against a raw rubber strip to form the base 10 and the entire assembly is enclosed with a forming die. An internal tube is positioned within the tubular section 10, as is usual in garden hose manufacture. The entire unit is then cured to form an integral hose section.

At spaced apart positions along the section, metallic threaded nipples 13 are imbedded. One extremity of the strip is provided with a female hose coupling 14, and the other extremity terminates in a male coupling 15.

The metallic nipples 13 are designed to receive either a perforated sprinkling head 16, as shown in Fig. 3, or a threaded plug 17, as shown in Fig. 4. The user can intersperse the plugs and sprinkling heads 16 and 17 along the strip to obtain the desired water distribution.

The strip may be employed as an intermediate section in a long hose by connecting a continuing hose to the male coupling 15, or it may be employed as the terminal of a hose in which case the male coupling 15 is closed by means of a suitable cap 18.

It can be readily seen that the invention will provide a longitudinally extending sprinkling member upon which any desired number of sprinkling heads can be positioned. It is flexible so that it may be rolled with the hose, and so that it may be turned or bent in use to cover irregular areas.

While the preferred method of manufacture has been described, it is possible that the article can be made by forming the base section of a continuous single member having a longitudinally extending channel in its upper face. The tubular section 10 can be a separate tube or hose which is laid into this channel and cemented therein. The final result in either case is the unitary article illustrated in Fig. 1.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A sprinkling hose comprising: a tubular hose section; nipples inset in the upper portion of said hose at spaced apart intervals; sprinkling heads threaded into said nipples; a relatively wide flat base extending throughout the length of said section to maintain said nipples in a vertical position, said base extending outwardly along both sides of said hose and formed as an integral part of said hose.

2. A sprinkling hose section comprising: a relatively long rubber tube; spaced apart sprinklers along the upper portion of said tube; and a relatively wide, flat bottom base of rubber formed integrally with said rubber tube and extending throughout its length to support said sprinklers in a vertical position.

3. A sprinkling hose section comprising: a relatively long rubber tube; spaced apart sprinklers along the upper portion of said tube; a relatively wide, flat bottom base of rubber formed integrally with said rubber tube and extending throughout its length to support said sprinklers in a vertical position; means for coupling a hose to one extremity of said tube; and means for closing the other extremity of said tube.

ROBERT J. LEPPER.